(12) United States Patent
Leung

(10) Patent No.: US 8,303,693 B2
(45) Date of Patent: Nov. 6, 2012

(54) NANOFIBER FILTER FACEMASKS AND CABIN FILTERS

(75) Inventor: Wallace W. Leung, Hong Kong (HK)

(73) Assignee: The Hong Kong Polytechnic University, Hong Kong (CN)

( * ) Notice: Subject to any disclaimer, the term of this patent is extended or adjusted under 35 U.S.C. 154(b) by 1422 days.

(21) Appl. No.: 11/740,513

(22) Filed: Apr. 26, 2007

(65) Prior Publication Data

US 2008/0264259 A1    Oct. 30, 2008

(51) Int. Cl.
*B03C 3/00* (2006.01)
*B01D 46/00* (2006.01)

(52) U.S. Cl. ............ 96/66; 55/DIG. 5; 55/DIG. 35; 55/486; 55/524; 55/527; 55/528; 96/134; 96/154; 96/226

(58) Field of Classification Search .......... 29/419; 55/489, 485, 385.3, 385.2, 385.1; 96/143, 96/226, 153; 977/773, 777, 882, 903
See application file for complete search history.

(56) References Cited

U.S. PATENT DOCUMENTS

| | | | | |
|---|---|---|---|---|
| 3,802,429 A * | 4/1974 | Bird | | 128/206.19 |
| 4,600,002 A * | 7/1986 | Maryyanek et al. | | 128/206.19 |
| 4,856,509 A * | 8/1989 | Lemelson | | 128/206.19 |
| 5,486,410 A * | 1/1996 | Groeger et al. | | 442/353 |
| 5,634,954 A * | 6/1997 | Kern | | 55/487 |
| 5,672,399 A * | 9/1997 | Kahlbaugh et al. | | 428/36.1 |
| 5,706,804 A * | 1/1998 | Baumann et al. | | 128/206.19 |
| 5,747,053 A * | 5/1998 | Nashimoto et al. | | 424/405 |
| 5,785,725 A * | 7/1998 | Cusick et al. | | 55/382 |
| 5,804,295 A * | 9/1998 | Braun et al. | | 428/323 |
| 5,883,026 A * | 3/1999 | Reader et al. | | 442/382 |
| 5,888,527 A * | 3/1999 | Nashimoto et al. | | 424/405 |
| 5,993,501 A * | 11/1999 | Cusick et al. | | 55/486 |
| 6,514,306 B1 * | 2/2003 | Rohrbach et al. | | 55/524 |
| 6,554,881 B1 * | 4/2003 | Healey | | 55/528 |
| 6,673,136 B2 * | 1/2004 | Gillingham et al. | | 95/273 |
| 6,706,086 B2 * | 3/2004 | Emig et al. | | 55/486 |
| 6,716,274 B2 * | 4/2004 | Gogins et al. | | 95/273 |
| 6,740,142 B2 * | 5/2004 | Buettner et al. | | 95/273 |
| 6,743,273 B2 * | 6/2004 | Chung et al. | | 55/482 |
| 6,746,517 B2 * | 6/2004 | Benson et al. | | 95/273 |
| 6,800,117 B2 * | 10/2004 | Barris et al. | | 95/273 |
| 6,827,764 B2 * | 12/2004 | Springett et al. | | 96/66 |
| 6,872,311 B2 * | 3/2005 | Koslow | | 210/502.1 |
| 6,875,256 B2 * | 4/2005 | Gillingham et al. | | 95/273 |
| 6,924,028 B2 * | 8/2005 | Chung et al. | | 428/357 |
| 6,974,490 B2 * | 12/2005 | Gillingham et al. | | 55/486 |
| 6,994,742 B2 * | 2/2006 | Barris et al. | | 55/487 |
| 7,008,465 B2 * | 3/2006 | Graham et al. | | 95/78 |
| 7,044,993 B1 * | 5/2006 | Bolduc | | 55/524 |
| 7,070,640 B2 * | 7/2006 | Chung et al. | | 55/487 |
| 7,090,712 B2 * | 8/2006 | Gillingham et al. | | 55/486 |
| 7,090,715 B2 * | 8/2006 | Chung et al. | | 55/528 |
| 7,115,150 B2 * | 10/2006 | Johnson et al. | | 55/486 |
| 7,179,317 B2 * | 2/2007 | Chung et al. | | 55/528 |
| 7,270,692 B2 * | 9/2007 | Gillingham et al. | | 55/486 |

(Continued)

*Primary Examiner* — Duane Smith
*Assistant Examiner* — Sonji Turner
(74) *Attorney, Agent, or Firm* — Wilkinson & Grist; George G. Wang

(57) ABSTRACT

A filtration medium includes a fine filter layer having a plurality of nanofibers and a coarse filter layer having a plurality of microfibers attached to the fine filter layer. The coarse filter layer is positioned proximal to a direction of fluid flow, and the fine filter layer is positioned distal to the direction of fluid flow.

38 Claims, 4 Drawing Sheets

U.S. PATENT DOCUMENTS

| | | | |
|---|---|---|---|
| 7,270,693 B2 * | 9/2007 | Chung et al. | 55/528 |
| 7,287,650 B2 * | 10/2007 | Koslow | 210/501 |
| 7,311,752 B2 * | 12/2007 | Tepper et al. | 55/528 |
| 7,316,723 B2 * | 1/2008 | Chung et al. | 55/527 |
| 7,318,852 B2 * | 1/2008 | Chung et al. | 55/527 |
| 7,318,853 B2 * | 1/2008 | Chung et al. | 55/528 |
| 7,390,343 B2 * | 6/2008 | Tepper et al. | 55/527 |
| 7,501,012 B2 * | 3/2009 | Tatarchuk et al. | 96/132 |
| 7,591,883 B2 * | 9/2009 | Kameoka et al. | 95/273 |
| 7,592,277 B2 * | 9/2009 | Andrady et al. | 442/340 |
| 2002/0046656 A1 * | 4/2002 | Benson et al. | 95/287 |
| 2002/0059868 A1 * | 5/2002 | Gogins et al. | 95/280 |
| 2002/0073667 A1 * | 6/2002 | Barris et al. | 55/486 |
| 2002/0092423 A1 * | 7/2002 | Gillingham et al. | 95/287 |
| 2003/0010002 A1 * | 1/2003 | Johnson et al. | 55/486 |
| 2003/0037675 A1 * | 2/2003 | Gillingham et al. | 95/280 |
| 2003/0106294 A1 * | 6/2003 | Chung et al. | 55/486 |
| 2003/0177909 A1 * | 9/2003 | Koslow | 96/154 |
| 2003/0191204 A1 * | 10/2003 | Hermann et al. | 521/82 |
| 2003/0205137 A1 * | 11/2003 | Bolduc | 95/285 |
| 2003/0207954 A1 * | 11/2003 | Hermann et al. | 521/134 |
| 2003/0216483 A1 * | 11/2003 | Hermann et al. | 521/50 |
| 2004/0016345 A1 * | 1/2004 | Springett et al. | 96/66 |
| 2004/0060268 A1 * | 4/2004 | Chung et al. | 55/482 |
| 2004/0060269 A1 * | 4/2004 | Chung et al. | 55/482 |
| 2004/0123572 A1 * | 7/2004 | Chung et al. | 55/482 |
| 2004/0134353 A1 * | 7/2004 | Gillingham et al. | 95/273 |
| 2004/0187454 A1 * | 9/2004 | Chung et al. | 55/482 |
| 2004/0200354 A1 * | 10/2004 | Barris et al. | 95/273 |
| 2004/0226443 A1 * | 11/2004 | Gillingham et al. | 95/273 |
| 2004/0255783 A1 * | 12/2004 | Graham et al. | 96/69 |
| 2005/0079379 A1 * | 4/2005 | Wadsworth et al. | 428/684 |
| 2005/0183405 A1 * | 8/2005 | Gillingham et al. | 55/486 |
| 2006/0057350 A1 * | 3/2006 | Ochi et al. | 428/292.1 |
| 2006/0068668 A1 * | 3/2006 | Kameoka et al. | 442/340 |
| 2006/0117730 A1 * | 6/2006 | Chung et al. | 55/524 |
| 2006/0137317 A1 * | 6/2006 | Bryner et al. | 55/528 |
| 2006/0141015 A1 * | 6/2006 | Tessier et al. | 424/443 |
| 2006/0196359 A1 * | 9/2006 | Gillingham et al. | 95/273 |
| 2006/0264130 A1 * | 11/2006 | Karles et al. | 442/59 |
| 2007/0012007 A1 * | 1/2007 | Chung et al. | 55/528 |
| 2007/0021021 A1 * | 1/2007 | Verdegan et al. | 442/334 |
| 2007/0039858 A1 * | 2/2007 | Noca et al. | 210/94 |
| 2007/0054579 A1 * | 3/2007 | Baker et al. | 442/364 |
| 2007/0056256 A1 * | 3/2007 | Tepper et al. | 55/527 |
| 2007/0175196 A1 * | 8/2007 | Tepper et al. | 55/527 |
| 2007/0190319 A1 * | 8/2007 | Kalayci | 428/364 |
| 2007/0207692 A1 * | 9/2007 | Ono et al. | 442/327 |
| 2007/0271883 A1 * | 11/2007 | Chung et al. | 55/361 |
| 2007/0271891 A1 * | 11/2007 | Chung et al. | 55/528 |
| 2007/0283808 A1 * | 12/2007 | Chung et al. | 95/285 |
| 2007/0287348 A1 * | 12/2007 | Autran et al. | 442/327 |
| 2008/0011662 A1 * | 1/2008 | Milosavljevic et al. | 210/284 |
| 2008/0017038 A1 * | 1/2008 | Wu | 96/154 |
| 2008/0070463 A1 * | 3/2008 | Arora et al. | 442/327 |
| 2008/0110342 A1 * | 5/2008 | Ensor et al. | 96/54 |
| 2008/0142433 A1 * | 6/2008 | McManus et al. | 210/500.1 |
| 2008/0229929 A1 * | 9/2008 | Marcoon | 96/296 |
| 2008/0264259 A1 * | 10/2008 | Leung | 96/143 |
| 2009/0018479 A1 * | 1/2009 | McCarthy et al. | 602/43 |

* cited by examiner

NANOFIBER FILTER FACEMASKS AND CABIN FILTERS

BACKGROUND

Gas streams often carry particulate materials including heavy metals, toxic organic chemicals, and selected microbiological molecules such as viruses. Common filter media include layered materials containing fibers of substances such as fiberglass, metals, ceramics and polymeric compositions. These filter media typically are ineffective in filtering submicron particulates and can easily become loaded with accumulated particles that restrict fluid flow. They also typically are non-economical because they must be replaced rather frequently. Furthermore, even if the filter media have tight pore sizes, such as those using non-woven micron sized fibers, for example HEPA filters (high efficiency performance airfilter), there can be significant drawbacks. These filters tend not to be as durable. In addition, because of the large pressure drops across the filter media, only the first few layers of fibers are capable effectively of filtering particles.

Consequently, it is desirable to develop a filtration medium with improved capacity of filtering particles of micron and sub-micron dimensions. It is also desirable to develop a filtration medium with improved filtering efficiency by reducing the pressure drop across the medium. Providing a filtration medium that can filter microbiological molecules, such as viruses, is also desirable. Moreover, it is desirable to develop a filtration medium with anti-microbial properties, as well as with the capability to release substances such as medications.

SUMMARY

According to one aspect, a filtration medium includes a fine filter layer having a plurality of nanofibers, and a coarse filter layer having a plurality of microfibers attached to the fine filter layer. The coarse filter layer is positioned proximal to a direction of fluid flow, and the fine filter layer is positioned distal to the direction of fluid flow.

According to another aspect, a method of making a filtration medium includes providing a fine filter layer having a plurality of nanofibers, providing a coarse filter layer having a plurality of microfibers, and attaching the fine filter layer to the coarse filter layer. The coarse filter layer is positioned proximal to a direction of fluid flow, and the fine filter layer is positioned distal to the direction of fluid flow.

DETAILED DESCRIPTION

Figure 1:
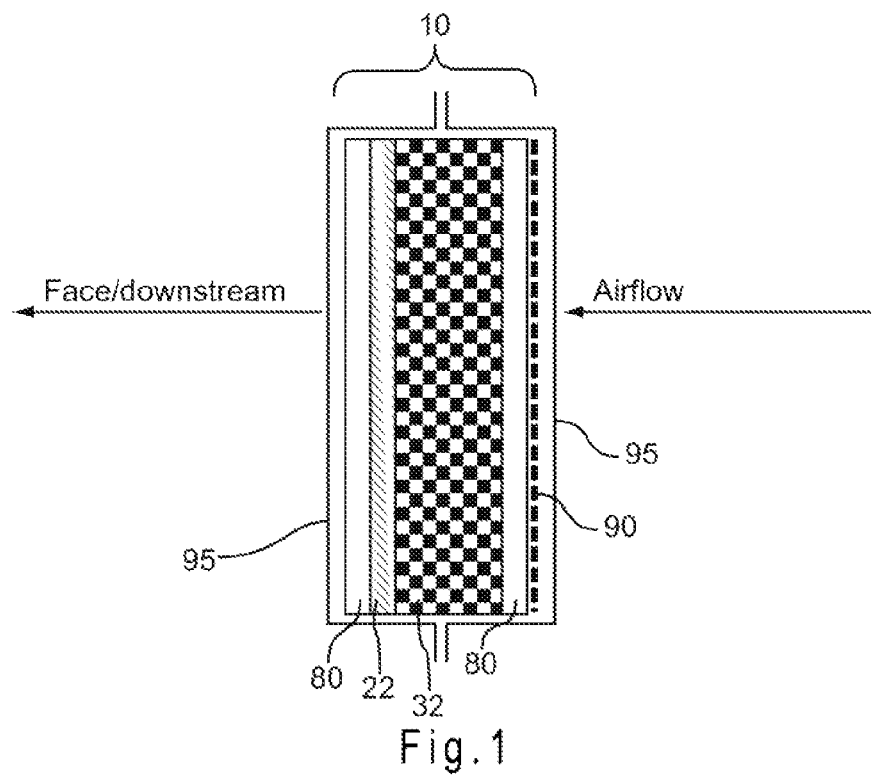
FIG. 1 depicts a cross-sectional view of an embodiment of a filtration medium.
Figure 3:
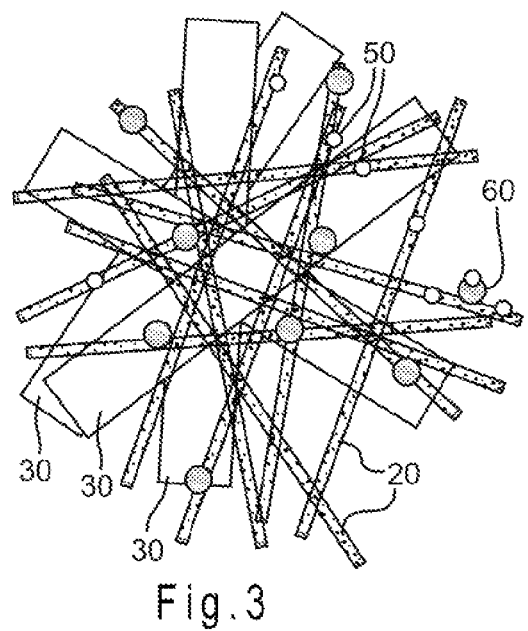
FIG. 3 depicts an enlarged view of the nanofibers used in the filtration medium of FIG. 1.

FIG. 1 represents an example of a filtration medium 10 including a fine filter layer 22 having a plurality of nanofibers, a coarse filter layer 32 having a plurality of microfibers, two optional cover layers 80 located respectively on both sides of the filter layers 22 and 32, an optional hydrophobic coating 90, and at least one optional protective layer 95. The coarse filter layer 32 is positioned proximal to a direction of fluid flow, and the fine filter layer 22 is positioned distal to the direction of fluid flow. FIG. 3 represents an example of a filtration medium that includes nanofibers 20, microfibers 30, optional antimicrobial substrates 50, and optional adsorption particles 60. The nanofibers of the fine filter layer 22 may include the nanofibers 20, and the microfibers of the coarse filter layer 32 may include the microfibers 30.

Figure 6:
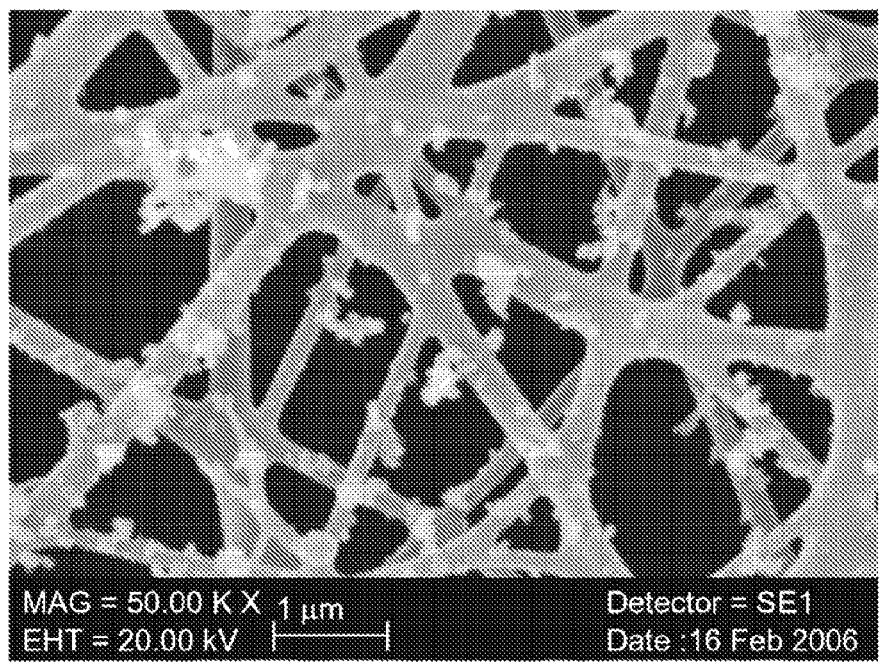
FIG. 6 depicts an optical image of nanofibers of the filtration medium of FIG. 1 including trapped nano-sized pollutants from engine emission.

The filtration medium 10 may include a plurality of nanofibers 20 and a plurality of substrate nanoparticles to form a fine filter layer 22. The fine filter layer 22 may be configured to filter nano-sized or sub-micron particles from the fluid stream, as depicted in FIG. 6. The filtration medium 10 may also include a plurality of microfibers 30 to form a coarse filter layer 32. The coarse filter layer 32 may be configured to filter micron-sized particles from the fluid stream. The fine filter layer 22 and the coarse filter layer 32 of the filtration medium 10 may adhere to one another to form a bi-layer unit that is a well-bonded laminate structure, as depicted in FIG. 1. The term "filter" means to intercept, hinder, impede or interfere with the passage of particles in a fluid stream. The term "fluid" means a liquid, gas, or combinations thereof.

The nanofibers 20 in the fine filter layer 22 may be obtained in a variety of ways. For example, nanofibers may be produced by electrospinning a polymer solution. In another example, nanofibers may be obtained by melt-blown polymers. Examples of applicable polymers may include polyolefin, polyacetal, polyamide, polyester, cellulose ether and ester, polyalkylene sulfide, polyarylene oxide, polysulfone, modified polysulfone polymers, nylon, polystyrene, polyacrylonitrile, polycarbonate and mixtures thereof. In one example, the nanofibers 20 may be formed by electrospinning Nylon 6 polymer from a 98% formic acid solution. In another example, the nanofibers 20 may be formed by electrospinning polystyrene or polyvinyl chloride from solutions in tetrahydrofuran (THF). In another example, the nanofibers 20 may be formed by electrospinning polyethylene oxide (PEO) dissolved in water. In yet another example, polyethylene-terephthalate (PET) and polyethylene-naphthalate (PEN) may be electrospun or spin-melted into nanofibers 20 directly from their polymer melts. So long as the resulting solution or polymer melt has a viscosity similar to that of honey, with viscosity of at least 2000-3000 cP at 25° C., the solution, melt or suitable candidate materials can thus be spun into nanofibers. Nanofibers 20 may also be formed using other processes known to one skilled in the art.

The nanofibers 20 may have an average diameter of about 5 to about 500 nanometers, preferably from about 100 to about 300 nanometers, and more preferably from about 150 to about 200 nanometers. For example, electrospun Nylon 6 nanofibers may have an average fiber diameter from about 147 to about 249 nanometers, when the weight percentage of Nylon 6 in a polymer solution ranges from about 18% to about 24%, and under the electrospinning condition of 25 kV electrode voltage and 14 cm tip-to-collector distance. The average fiber diameter may be characterized by taking an SEM (scanning electron microscope) image and randomly selecting and measuring the diameters of 30 nanofibers 20 from the image. By reducing the distance between the tip-to-collector, e.g. 5 centimeters, the fiber diameter can increase to 600-800 nanometers. One possible explanation for this reduction in diameter is that the fibers do not have time to get thinner (i.e. smaller in diameter) by stretching through charge repulsion from like charges deposited on the fiber surface.

The nanofibers 20 in the fine filter layer 22 may be porous. For example, nanofibers 20 obtained from electrospun polystyrene may have a mean pore size among the nanofibers 20 of about 90 to about 150 nanometers. Electrospinning poly-L-lactide (PLLA) dissolved in dichloromethane may provide nanofibers 20 having a pore size among the nanofibers of about 100 nanometers in width and 250 nanometers in length along the fiber axis. Larger micron-sized pores are also possible. The pore size of the nanofibers 20 can be a useful characterization in predicting the size of particles in a fluid stream that may be trapped by the nanofibers 20, rather than determining this parameter through a direct screening process based on a size by size basis.

The nanofibers 20 may have a surface area-to-volume ratio of about $1.3 \times 10^7$/meter to about $4 \times 10^8$/meter. The large surface area-to-volume ratio can provide a large surface area for capture, as well as for enhancing molecular diffusion through the fiber. While not being bound by theory, it is believed that the surface area to volume ratios of nanofibers 20, A/V, may be estimated from the fiber diameter as follows:

$$\frac{A}{V} = \frac{\pi D L}{\pi D^2 L/4} = \frac{4}{D}$$

Specifically, when the minimum nanofiber diameter D is about 10 nm, the estimated maximum A/V is about $4 \times 10^8$/m. When the nominal nanofiber diameter D is about 150 nm, the estimated nominal A/V is about $2.7 \times 10^8$/m. When the maximum nanofiber diameter D is about 300 nm, the minimum estimated A/V is about $1.3 \times 10^7$/m.

The fine filter layer 22 may have a thickness of about 10 to about 1000 microns. The packing density of nanofibers 20 may vary. A combined measure of the packing density and the layer thickness is the mass of fibers per surface area of the filter. Preferably, the fine filter layer includes from about 0.1 to about 1 gram per square meter of nanofibers. Consequently, nanofibers 20 may be used to intercept particles in the nanometer size range as they pass through the fine filter layer 22. Without being bound by theory, it is believed that since the size of the nanofibers 20 is close to the molecular mean free path of fluid molecules, there is aerodynamic slip over the nanofiber surfaces. This may lead to a reduction in viscous drag, resulting in a lower pressure drop across the fine filter layer 22 despite its enhanced ability to capture particles.

The nanofibers 20 may also carry an electrical charge. Nanofibers 20 having an electrical charge may be used to further intercept particles in the fluid stream that may be carrying an opposite electrical charge. The electrical charge may be added to the nanofibers 20 according to known methods in the art, such as electrospinning. For example, as a polymer solution or polymer melt is ejected from the electrodes at the end of the electrospinning process, the nanofibers 20 may become electrically charged. The addition of materials that are poor electrical conductors (i.e. excellent electrical insulators) such as wool may help maintain the electrostatic charge associated with the nanofibers 20 for a longer time.

Additional charges may be induced on the nanofibers, for example by treatment of a filter layer formed from the nanofibers. In one example, corona discharge can be applied to a filter containing the nanofibers 20 laid on the supporting mat, prior to the filter being trimmed to its final dimension. The nanofibers 20 may be treated in an electric field of corona discharge, in which positively charged particles move to the cathode, and negatively charged particles move to the fiber surface. Ions may be trapped at the depth of several molecular layers under the surface, and electrons may penetrate into the bulk of the polymer.

The nanofibers 20 may include one or more additives, such as in a particulate, fiber, whisker, or powder form. The fine filter layer 22 may also include a plurality of substrate nanoparticles randomly spread among the nanofibers 20, as depicted in FIG. 3. Examples of substrate nanoparticles may include anti-microbial substrates 50 and adsorption particles 60. The content of the substrate nanoparticles in the fine filter layer 22 preferably is from about 0.1 percent by weight (wt %) to about 10 wt %. The substrate nanoparticles may be organic or inorganic. The substrate nanoparticles may be porous or non-porous. Preferably, the substrate nanoparticles may have high porosity, for example, from about 40% to about 80%, and high surface area, for example, from about 10 to about $10^4$ meter squared per gram of nanopowder. Thus, the substrate nanoparticles may also be used to separate nano-sized particles onto their surfaces or inside their nano pores (1-100 nm) when nano-sized particles pass through the fine filter layer 22.

The substrate nanoparticles may be obtained from the same electrospinning process as described above, whereby the polymers and substrate nanoparticles may be added sequentially and electrospun to form a fine filter layer 22 that includes a plurality of nanofibers 20 and a plurality of substrate nanoparticles randomly mixed together. The substrate nanoparticles may also be incorporated into the fine filter layer 22 according to other methods known to one skilled in the art.

The substrate nanoparticles may include anti-microbial substrates 50. The term "anti-microbial substrates" means any chemicals or particles that may be used to kill or make unviable microbes, viruses or bacteria. Examples of anti-microbial substrates 50 may include nano-particles made of magnesium oxide (MgO), silver (Ag) compounds including silver nitrate, titanium oxide nanoparticles, Poly(N-benzyl-4-vinylpyridinium chloride), or combinations thereof.

Magnesium oxides may be effective biocides against gram positive and gram-negative bacteria such as *E. coli* and *Bacillus megaterium*, and against bacterial spores such as *Bacillus Subtillus*. Silver nanoparticles may be effective biocides for gram positive and gram-negative bacteria such as *Staphylococcus aureus, E. coli, Klebsiella pneumoniae* and *Pseudomonas aeruginosa*. In one example, silver nitrate may be electrospun with cellulose acetate. After photo-reduction, the silver nanoparticles may remain with the cellulose nanofibers 20. Both MgO and Ag may be adapted to erode into the membrane of the bacteria and cause death to the bacteria.

Titanium oxide nanoparticles may also be used to kill bacteria and viruses after the nanoparticles are activated by ultraviolet light to produce strong oxidation reaction. Titanium oxide nanoparticles may be electrospun with a polymer to form particles adhered to the polymer nanofibers 20. When activated by ultraviolet light in the visual light spectrum, titanium oxide nanoparticles may kill entrapped virus and bacteria that may get caught by the fine filter layer 22. An example of an organic compound that may be an anti-microbial substrate includes Poly(N-benzyl-4-vinylpyridinium chloride), which has a strong affinity to virus bacteriophage T4 and a mean pore size of about 14.7 microns.

Anti-microbial substrates 50 may be combined with the nanofibers 20 according to any known methods in the art. In one example, a non-woven cloth may first be soaked in a monomer mixture containing 4-vinylpyridine, and then sandwiched by two pieces of glass plate on top and bottom, respectively. The sandwiched cloth may then be placed into a water bath and heated in a pressure-cooker. The polymerization may occur in the non-woven cloth, with the 4-vinylpyridine polymer structure attached onto the supporting non-woven cloth. In another example, non-leaching anti-microbial treatments may be applied by covalently grafting anti-microbial polymers onto textile surfaces. Polymer grafting onto nanofibers 20 may be accomplished in a variety of ways, such as by forming an anti-microbial polymer through atom transfer radical polymerization from an initiating surface, resulting in covalent attachment of an antimicrobial agent to the polymer surface.

In yet another example of combining the anti-microbial substrate 50 with the nanofibers 20, a technology called iCVD (initiated condensed vapour deposition) may be used to coat an anti-microbial substrate 50 onto fiber surfaces by tracing through the contour of non-woven fiber but without blocking the pores between the fibers. The non-woven fabric may be maintained at room temperature during the deposition process. A further example may include mixing antimicrobial particles, a polymer solution, and a small amount of an adhesive into a mixture for electrospinning. The adhesive may allow the antimicrobial particles to be embedded in or adhered to the nanofibers 20. The antimicrobial particles may preferably be smaller in size than the nanofibers 20.

Figure 4:
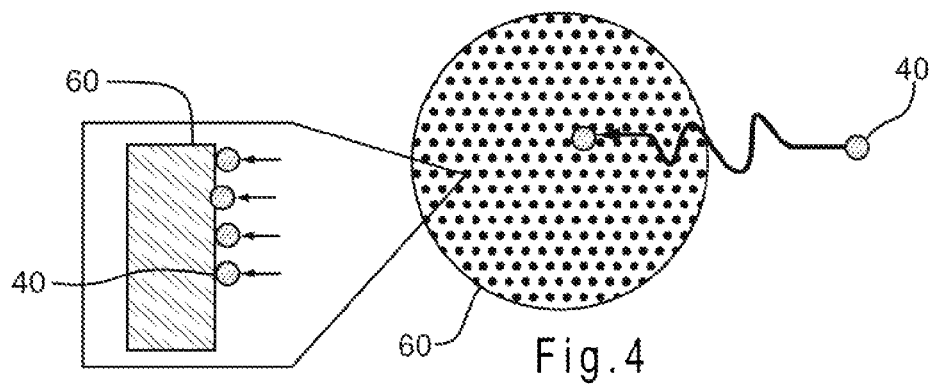
FIG. 4 depicts an exploded view of adsorption particles incorporated with the nanofibers of FIG. 3.

The substrate nanoparticles of the fine filter layer 22 may also include adsorption particles 60. The term "adsorption particles" means nano-sized adsorbents, with molecule sizes from about 0.5 to about 100 nanometers, that may physically attract and adsorb particles 40 and volatile organic compounds (VOCs) from a fluid stream to the surface of the adsorption particle, as depicted in FIG. 4. This attraction may involve electrostatic or chemical interaction. Therefore, the adsorption particles 60 may be used to remove particles 40 and VOCs from the fluid stream, in addition to the nanofibers 20 and optional anti-microbial substrates 50.

The content of adsorption particles 60 in the fine filter layer 22 preferably is from about 0.1 wt % to about 10 wt %. The amount of adsorption particles 60 used may depend upon the particular application of the filtration medium 10. The adsorption particles 60 may be introduced by combining the particles with a polymer melt or a polymer solution, and then forming nanofibers using the electrospinning process as described above.

Examples of adsorption particles 60 may include activated carbon, silica gel, activated alumina, zeolites, porous clay minerals, molecular sieves, or combinations thereof. Nano-sized absorbents made of zinc oxide, calcium oxide, cupric oxide, magnesium oxide, manganese dioxide, manganese oxide, aluminum oxide, and zeolite may also be used to filter specific molecules such as hydrogen sulphide. In one example, activated carbon nanoparticles with surface areas from about 10 to about $10^4$ meter square per gram ($m^2/g$) and particle porosities of 40-90% may be used to filter or trap odor and/or smoke particles 40. One process of obtaining these fine carbon nanoparticles is to subject large micron sized activated carbon particles to autogenous or semi-autogenous grinding. In this process, the particles are ground to dimensions on the order of 10 to 100 nanometers. Table 1 below shows the amount in grams of various chemicals in vapor (VOC) adsorbed per gram of this activated carbon, denoted as g/g.

TABLE 1

Vapor in gram of vapor adsorption per gram of activated carbon

| Vapor | Adsorption Capacity, g/g |
|---|---|
| Acetamide | 0.494 |
| Acrylonitrile | 0.357 |
| Benzene | 0.409 |
| Carbon tetrachloride | 0.741 |
| Chloroform | 0.688 |
| Bis(Chloromethyl)ether | 0.608 |
| Chloromethyl methyl ether | 0.480 |
| 1,2 Dibromo-3-chloropropane | 0.992 |
| 1,1 Dibromomethane | 0.962 |
| 1,2 Dibromomethane | 1.020 |
| 1,2 Dichloroethane | 0.575 |
| Diepoxy butane (meso) | 0.510 |
| 1,1-Dimethyl hydrazine | 0.359 |
| 1,2-Dimethyl hydrazine | 0.375 |
| Dimethyl sulfate | 0.615 |
| p-Dioxane | 0.475 |
| Ethylenimine | 0.354 |
| Hydrazine | 0.380 |

Figure 5:
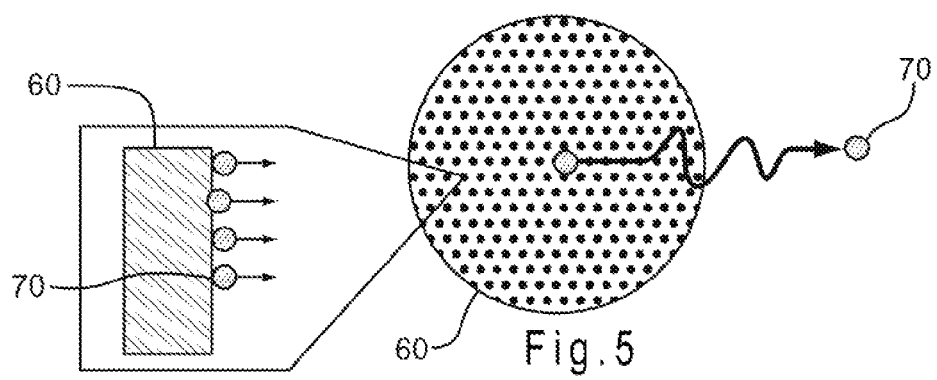
FIG. 5 depicts an exploded view of desorption substances incorporated with the nanofibers of FIG. 3.
Figure 7:
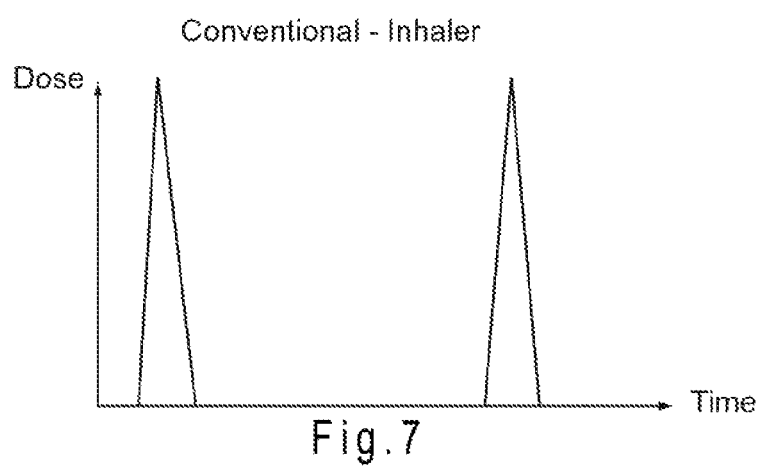
FIG. 7 depicts a general profile of dosage release of drug in an inhaler.
Figure 8:
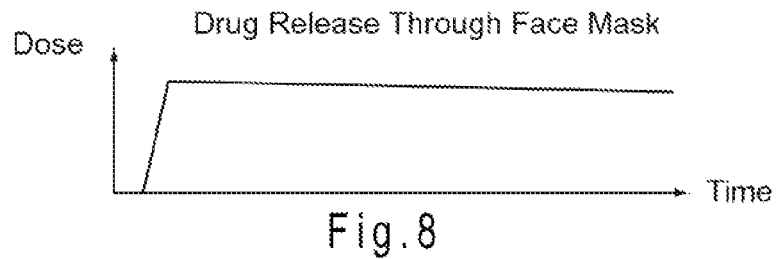
FIG. 8 depicts a general profile of dosage release of drug using the desorption substances of FIG. 5.
Figure 9:
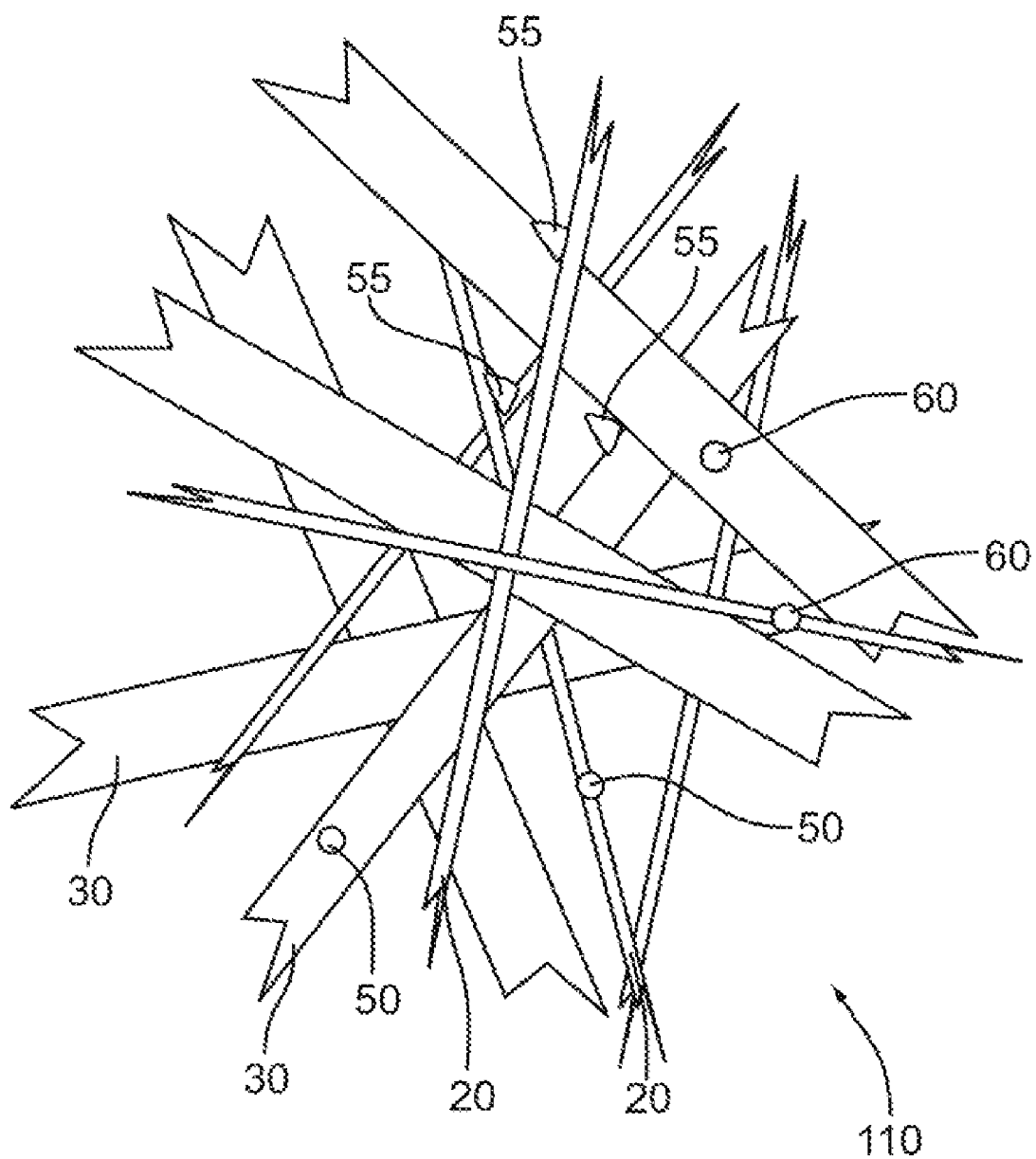
FIG. 9 depicts another embodiment of a filtration medium with mixed nanofibers and microfibers.

The substrate nanoparticles of the fine filter layer 22 may also include a plurality of desorption substances 70. The term "desorption substances" mean particles or vapor that may diffuse away from the surfaces or pores of the substrate nanoparticles, as depicted in FIG. 5. For example, desorption substances 70 may include medication or fragrance particles or vapor. The desorption substances 70 may be diffused gradually over time, rather than being released in a single dose or in multiple dose pulses. The general release profiles of a conventional inhaler and of a filtration medium 10, such as a face mask, with desorption substances 70 are depicted in FIGS. 7 and 8, respectively. Therefore, desorption substances 70 may be particularly beneficial to users who may be suffering from respiratory illness such as asthma or who may be sensitive to contaminants in the surroundings, such as smoke or bad odor.

The content of desorption substances 70 in the fine filter layer 22 preferably is from about 0.01 to about 1 wt %. The amount of desorption substances 70 used may depend upon the particular application of the filtration medium 10. The substrate nanoparticles used for adsorption described above may also be used for the release of desorption nanoparticles such as fragrance or medication. Methods for attaching the desorption substances 70 onto the substrate nanoparticles may include any known methods in the art. For example, substrate nanoparticles having the drug or fragrance release capability may be prepared by placing the nanoparticles into a chamber under low temperature and high pressure to allow fragrance and medication to adsorb favorably onto the surface of the substrate nanoparticles.

Desorption substances 70 for treating asthma and respiratory diseases may be used in medical applications. Examples of desorption substances 70 may include steroids for chronic obstructive pulmonary disease; albuterol powder for the treatment of asthma; respirable antisense oligonucleotides (RASONs) for attenuating specific disease-associated mRNAs; Spiriva HandiHaler® (tiotropium bromide, available from Boehringer Ingelheim) for the treatment of bronchospasm associated with chronic obstructive pulmonary disease; Qvar® (beclomethasone dipropionate, available from Ivax) for the treatment of asthma; Xopenex® (available from Sepracor) as inhaled solution for treatment of reversible obstructive airway disease; DuoNeb® (albuterol sulfate and ipratropium bromide, available from Dey Laboratories) for the treatment of bronchospasm associated with COPD; Foradil Aerolizer® (formoterol fumarate inhalation powder, available from Novartis) as bronchodilator for COPD, asthma and bronchospasm; Ventolin HFA® (albuterol sulfate inhalation aerosol, available from GlaxoSmithKline) for the treatment or prevention of bronchospasm; Tri-Nasal Spray® (triamcinolone acetonide spray, available from Muro Pharmaceutical) for treatment of nasal symptoms of allergic rhinitis in adults and children age 12 or older; Proventil HFA Inhalation Aerosol® (available from 3M Pharmaceuticals) for treatment or prevention of bronchospasm; Rhinocort Aqua Nasal Spray® (available from AstraZeneca) for nasal spray containing budesonide; or combinations thereof.

Figure 2:
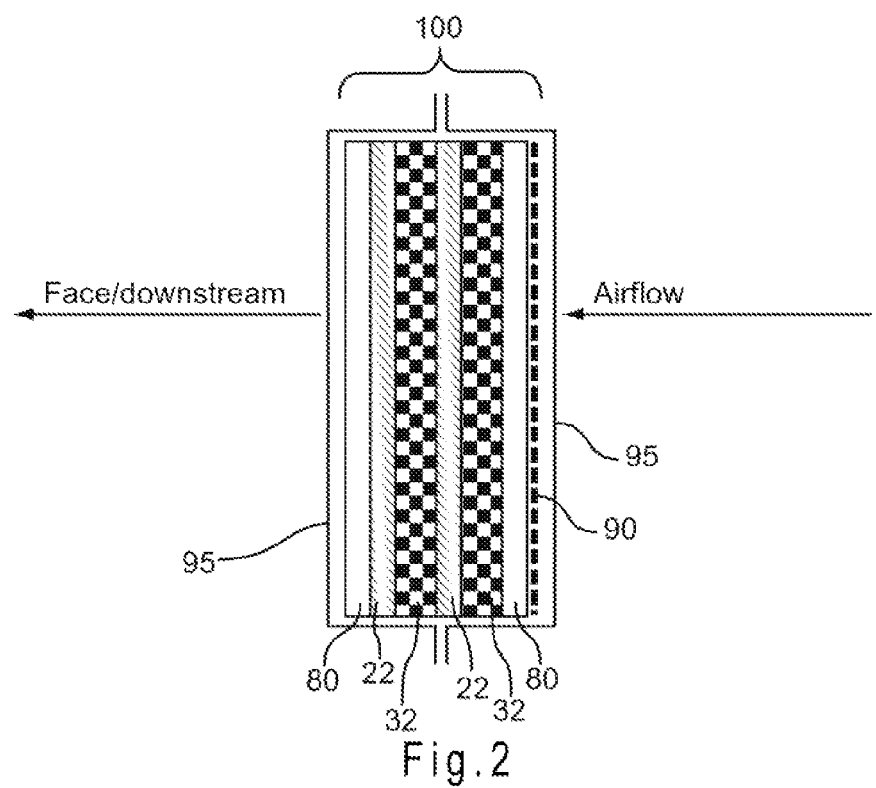
FIG. 2 depicts a cross-sectional view of another embodiment of the filtration medium of FIG. 1.

The desorption substances 70 may also be used in household, cosmetic or industrial applications to modulate the immediate surrounding environment. In one example, Symbicort® made by Astrazeneca and Serevent® made by GSK (GlaxoSmithKline) may be used for both adsorption and release of particles. These may be in powder form or liquid aerosol form that may be adsorbed onto the substrate nanoparticles. The substrate nanoparticles containing these agents may be electrospun with the nanofibers 20 for the filtration medium 10. In another example, different refreshing fragrance (some of which may be for relaxation therapy) such as the drug which requires no physician prescription—Eucalyptus® oil (for example available from Bosisto) may be adsorbed onto the substrate nanoparticles. These desorption substances may be released later during use.

The filtration medium 10 may also include a plurality of microfibers 30 to form the coarse filter layer 32. Examples of microfibers may include polyethylene, glass, cellulose acetate, activated carbon fiber or combinations thereof. The microfibers 30 may have an average diameter of about 1 to about 30 microns, which may include finer microfibers having an average diameter of about 1 to about 20 microns and coarser microfibers having an average diameter of about 10 to 30 microns, such as activated carbon fiber. Therefore, the microfibers 30 may be used to filter particles in the micron size range as a fluid containing the particles passes through the coarse filter layer 32.

In one example, the nanofibers 20 may be directly electrospun onto the surface of a sheet of non-woven microfibers 30. In another example, the microfibers 30 may be placed in a liquid, and nanofibers 20 may be electrospun onto them. The liquid suspension may then be air-circulated, and the liquid may be removed under vacuum. Subsequently, the microfibers 30 and nanofibers 20 may be compressed mechanically together with a small amount of compatible adhesive to form a rigid structure.

For example, the coarse filter layer 32 may have a thickness of about 0.1 to about 2 millimeters for facemask applications, and may have a thickness of about 1 to 20 millimeters for ventilation applications. The content of the microfibers 30 in the filtration medium 10 may vary from about 100 to about 600 grams per square meter of filter area. The coarse filter layer 32 may also provide mechanical strength as support for the filtration medium 10, without the need of having a substrate layer.

The fine filter layer 22 and the coarse filter layer 32 of the filtration medium 10 may adhere to one another to form a bi-layer unit, as depicted in FIG. 1. The bi-layer unit may be a well-bonded laminate structure. The term "well-bonded laminate structure" means a multilayer filtration medium 10 in which none of the layers are corrugated. Using layers with small thickness may facilitate the formation of a well-bonded laminate structure. The filtration medium 10 may be split into two filter layers in a series. The coarse filter layer 32 includes the microfibers 30, and may have a large solid holding capacity and voids that may be used to trap larger particles and solids. The fine filter layer 22 includes the nanofibers 20 immediately downstream of the coarse filter layer, and has smaller voids and less solid holding capacity, and may be used to trap finer particles.

Preferably, the coarse filter layer 32 is positioned proximal to a direction of fluid flow, while the fine filter layer 22 is positioned distal to that direction. The term "a direction of fluid flow" means the direction where fluid is flowing from one upstream location to another downstream location. The microfibers 30 may be used to first filter micron-sized coarse particles and some submicron-particles in the fluid stream that initially enter the filtration medium 10, leaving the nanofibers 20 relatively unoccupied to filter mainly sub-micron sized fine particles that may have escaped the coarse filter layer 32 upstream of the flow. This configuration may provide higher filtration efficiency by the reducing pressure drop across the filtration medium 10.

This configuration also may make the filtration medium 10 more durable and economical. While not being bounded by theory, it is believed that particles will choose the passage that is least restricted. Consequently, because nanofibers 20 are not clogged with coarse particles as frequently as in conventional filtration media, the filtration medium 10 with this configuration may have a longer useful life.

In another embodiment, the filtration medium 100 may have multiple layers, as depicted in FIG. 2. The multilayer filtration medium 100 may include more than one bi-layer unit arranged in a series of parallel and repeating bi-layer laminate units, such that the filtration medium 100 alternates between fine filter layers 22 and coarse filter layers 32. The number of bilayers in the filtration medium 100 may be determined by factors including the desired overall medium thickness, the thickness of each layer, and the allowed maximum pressure drop. The filtration efficiency of the filtration medium 100 may be improved relative to that of the filtration medium 10.

Multilayer filtration medium 100 may include two or more layers of fibers that have been combined into a monolithic unit with a strong coupling between the individual layers. The term "monolithic unit" means a unit that has multiple layers that adhere to one another and function as a single unit. Preferably, the coupling between the layers may be achieved without using compatibilizing agents, although compatibilizing agents may be used to optimize the properties of the multilayer filtration medium 100.

In another embodiment, the filtration medium 110 may be in the form of a single filter unit containing a mixture of nanofibers 20, porous nanoparticles, microfibers 30, adsorption particles 60, without layering as depicted in FIG. 9. This configuration may allow more and larger anti-microbial chemicals to be bonded onto the nanofibers 20 and microfibers 30 directly. The ratio of nanofibers 20 to microfibers 30 may vary from 1%:99% to 15%:85%, preferably 10%:90%, by weight based on fibers only. A trace amount of adhesive 55 may be added to facilitate the adhesion of nanofibers 20 to the microfibers 30. A method of making the filtration medium 110 having a single filter unit includes electrospinning a mixture that contains nanofibers 20, substrate nanoparticles 60, antimicrobial particles 50 and microfibers 30 as already described above.

The filtration medium 10, 100 or 110 may also include one or more cover layers 80 bonded to the laminate, as depicted in FIGS. 1 and 2. The cover layer 80 may include, for example, a woven material. Preferably, the cover layers 80 are positioned adjacent the fine filter layer 22 and distal to the direction of fluid flow, and positioned adjacent the coarse filter layer 32 and proximal to the direction of fluid flow. The cover layers 80 are used to protect the filter upstream from the environment (facing flow) and downstream from the person wearing the face mask from inhaling loose detached fibrous materials from the filter.

The filtration medium 10, 100 or 110 may further include a hydrophobic layer 90 bonded to one of the cover layers 80, as depicted in FIGS. 1 and 2. Preferably, the hydrophobic layer 90 is bonded to the cover layer 80 adjacent the coarse filter layer 32. The hydrophobic layer 90 may be configured to allow free gas exchange to occur across the filtration medium 10, 100 or 110, while preventing water and other aqueous liquids from entering. Thus the hydrophobic layer 90 can prevent virus bearing water droplet from wetting and penetrating the cover 80. The hydrophobic layer 90 may be non-polar. Examples of non-polar polymers include PTFE, glass composites and nylon. Polyethersulfone (PES) and acrylic copolymers may also be used to render the filtration medium 10, 100 or 110 hydrophobic, which may cause membranes to become non-wettable by most low-surface tension liquids. Biodegradable polymers may also be used, which may include aliphatic polyesters such as poly(lactic acid), poly(glycolic acid), polycaprolactone, and their copolymers.

The filtration medium 10, 100 or 110 may be covered with two protective layers 95 on both the front and back of the filtration medium 10, 100 or 110. Preferably, one of the protective layers 95 is positioned proximal to the direction of fluid flow while the other one 95 is positioned adjacent to the direction of fluid flow, as depicted in FIGS. 1 and 2. Alternatively, the filtration medium 10, 100 or 110 be placed in a sealed bag 96 (not shown). The protective layers 95 and protective bag 96 may include an impervious plastic cover, for example, SARAN polyvinylidene chloride (PVDC), such that the desorption substances 70 may be preserved until the time of use. The protective layers 95 and protective bag 96 may be configured to protect the fine filter layer 22 from exposure to the surroundings before the filtration medium 10, 100 or 110 is ready to be used. Moreover, the protective layers 95 and protective bag 96 may be used to prevent the desorption particles from diffusing away from the fine filter layer 22 and into the surroundings until the filtration medium 10, 100 or 110 is ready to be used. The protective layers 95 and protective bag 96 may further prevent UV radiation which can activate the titanium dioxide in the filter. Storing the filtration medium 10 in a cool area may also help the desorption substances 70 to stay adsorbed within the filtration medium 10.

The filtration medium 10, 100 or 110 may be used in healthcare applications including filter facemasks, respirator filters and ward filtrations, cabin filtration in automobiles, trains, and airplanes, as well as in household applications such as vacuum filters, and in industrial applications such as air circulation filters. A filtration article may include a body and a filtration medium attached to the body. For example, the body may provide a frame or support for the filtration medium. The exact thickness and packing density of the filtration medium may be optimized to minimize the pressure drop, while still filtering particles ranging between 10 nm and 10 microns accordingly to actual need by one skilled in the art.

In one example, the filtration medium 10, 100 or 110 may be adapted to form a facemask. The coarse filtration layer of the facemask having microfibers 30 may have a thickness of about 0.1 to 1 millimeters, with a packing density of microfibers 30 from about 100 to about 500 grams of fibers per square meter of filter area. The finer filtration layer having nanofibers 20 may have a thickness of about 0.01 to about 0.2 millimeters, with a packing density of nanofibers 20 of about 0.1 to about 1 gram of nanofibers per square meter of filter area.

In another example, the filtration medium 10, 100 or 110 may be adapted to form a ventilation device. The coarse filtration layer of the facemask having microfibers 30 may have a thickness of about 5 to 20 millimeters with a packing density of microfibers 30 from 300 to 3000 grams of fiber per square meter of filter. The finer filtration layer having nanofibers 20 may have a thickness of about 0.2 to about 0.5 millimeters with a packing density of nanofibers 20 of about 0.3 to 2 grams per square meter of filter. For example, the filtration medium 10 may capture particles from about 10 microns to about 10 nanometers.

Reference will now be made in detail to the preferred embodiments of the invention, examples of which are also provided in the following description. Exemplary embodiments of the invention are described in detail, although it will be apparent to those skilled in the relevant art that some features that are not particularly important to an understanding of the invention may not be shown for the sake of clarity.

Furthermore, it should be understood that the filtration medium is not limited to the precise embodiments described below and that various changes and modifications thereof may be effected by one skilled in the art without departing from the spirit or scope of the invention. For example, elements and/or features of different illustrative embodiments may be combined with each other and/or substituted for each other within the scope of this disclosure and appended claims.

The filtration medium is further illustrated by the following examples, which are not to be construed in any way as imposing limitations upon the scope thereof. On the contrary, it is to be clearly understood that resort may be had thereof which, after reading the description herein, may suggest themselves to those skilled in the art without departing from the spirit of the specification and/or the scope of the appended claims.

EXAMPLES

Example 1

Method and Conditions of Electrospinning Process to Produce Nanofibers

Nylon 6 pellets were added into 98% formic acid in suitable proportion (i.e. 15, 18, 21 and 24 wt % of N6 to 98% formic acid) and into an electrospinning machine (available from KES Kato Tech Co. Ltd. (Japan) NEU-010 Nanofiber) for mixing. The machine had an electrode voltage of 25 kV, a tip-to-collector distance of 14 cm, and a syringe feed rate of 0.72 to 1.45 mm$^3$/s. After the polymer mixture was collected from the machine, it was allowed to stay overnight under room temperature, or until a honey-like viscous liquid was formed. Optionally, an ultrasonicator may be used to mix the suspension of polymer and solvent.

Example 2

Method of Melt Blown Process to Produce Nanofibers

Melt blowing (MB) technique was used to produce nanofiber directly from polymers or resins using high-velocity air or another appropriate force. The MB process used five elements: extruder, metering pumps, die assembly, web formation, and winding. The extruder consists of a heated barrel with a rotating screw inside to melt polymer and pump it to the die assembly. Die assembly has a die nosepiece which is a wide, hollow and tapered piece of metal having several hundred orifices across the width. The polymer melt was extruded from these holes to form filament strands, which were subsequently attenuated by high velocity hot air, exiting from the top and bottom sides of the die nosepiece, to form fine fibers. The high velocity hot air was generated using an air compressor and passed through a heat exchange unit. Typical air temperatures range from 230° C. to 360° C. at velocities of 0.5 to 0.8 the speed of sound. The nanofibers were then laid randomly onto the collecting screen and form a self-bonded nonwoven web.

While the examples of the filtration medium have been described, it should be understood that the filtration medium are not so limited and modifications may be made. The scope of the filtration medium is defined by the appended claims, and all devices that come within the meaning of the claims, either literally or by equivalence, are intended to be embraced therein.

I claim:

1. A filtration medium, comprising:

a fine filter layer comprising a plurality of nanofibers; and a coarse filter layer comprising a plurality of microfibers, the coarse filter layer attached to said fine filter layer, wherein said coarse filter layer is positioned proximal to a direction of fluid flow, and said fine filter layer is positioned distal to said direction of fluid flow.

2. The filtration medium of claim 1, wherein said nanofibers comprise electrospun polymer fibers.

3. The filtration medium of claim 1, wherein said nanofibers comprise melt-blown polymer fibers.

4. The filtration medium of claim 1, wherein said nanofibers have an average diameter of about 5 to about 500 nanometers.

5. The filtration medium of claim 1, wherein said nanofibers have a surface area-to-volume ratio of about $1.3\times10^7$/meter to about $4\times10^8$/meter.

6. The filtration medium of claim 1, wherein said nanofibers comprise an electrical charge.

7. The filtration medium of claim 1, wherein said fine filter layer further comprises a plurality of substrate nanoparticles.

8. The filtration medium of claim 7, wherein the content of said substrate nanoparticles in said fine filter layer is from about 0.1 wt % to about 10 wt %.

9. The filtration medium of claim 7, wherein said substrate nanoparticles comprise anti-microbial substrates.

10. The filtration medium of claim 9, wherein said anti-microbial substrates are porous.

11. The filtration medium of claim 9, wherein said anti-microbial substrates comprise magnesium oxide, silver nanoparticles, silver nitrate, titanium oxide nanoparticles, Poly(N-benzyl-4-vinylpyridinium chloride), or combinations thereof.

12. The filtration medium of claim 7, wherein said substrate nanoparticles comprise adsorption particles.

13. The filtration medium of claim 12, wherein said adsorption particles comprise activated carbon, silica gel, activated alumina, zeolites, porous clay minerals, molecular sieves, zinc oxide, calcium oxide, cupric oxide, magnesium oxide, manganese dioxide, manganese oxide, aluminum oxide, zeolite, or combinations thereof.

14. The filtration medium of claim 12, wherein said adsorption particles comprise carbon nanoparticles.

15. The filtration medium of claim 7, wherein said substrate nanoparticles comprise desorption substances.

16. The filtration medium of claim 15, wherein said desorption substances comprise steroids, albuterol powder, respirable antisense oligonucleotides tiotropium bromide, beclomethasone dipropionate, albuterol sulfate and ipratropium bromide, formoterol fumarate inhalation powder, albuterol sulfate inhalation aerosol, triamcinolone acetonide spray, or combinations thereof.

17. The filtration medium of claim 1, wherein said fine filter layer has a thickness of about 10 to about 1000 microns.

18. The filtration medium of claim 1, wherein said fine filter layer has a packing density of nanofibers of about 0.1 to about 2 grams per square meter of filter area.

19. The filtration medium of claim 1, wherein said microfibers comprise polyethylene, glass, cellulose acetate, activated carbon, or combinations thereof.

20. The filtration medium of claim 1, wherein said microfibers have an average diameter of about 1 to about 30 microns.

21. The filtration medium of claim 1, wherein said coarse filter layer has a thickness of about 0.1 to about 20 millimeters.

22. The filtration medium of claim 1, wherein said fine filter layer and said coarse filter layer form a bi-layer unit that is a well-bonded laminate structure.

23. The filtration medium of claim 1, wherein said fine filter layer and said coarse filter layer form a bi-layer unit, the filtration medium further comprising a plurality of said bi-layer units.

24. The filtration medium of claim 1, further comprising a cover layer on said fine filter layer.

25. The filtration medium of claim 24, further comprising a protective layer on said cover layer.

26. The filtration medium of claim 1, further comprising a cover layer on said coarse filter layer.

27. The filtration medium of claim 26, further comprising a hydrophobic layer on said cover layer.

28. The filtration medium of claim 27, further comprising a protective layer on said hydrophobic layer.

29. A filtration article, comprising a body and the filtration medium of claim 1 attached to said body.

30. The filtration article of claim 29, wherein the filtration article is selected from a filter facemask, a ward filter, a ventilation filter, a vehicle filter, a vacuum filter, and a respirator filter.

31. A method of making a filtration medium, comprising:

providing a fine filter layer comprising a plurality of nanofibers;

providing a coarse filter layer comprising a plurality of microfibers; and attaching said fine filter layer to said coarse filter layer, wherein said coarse filter layer is positioned proximal to a direction of fluid flow and said fine filter layer is positioned distal to said direction of fluid flow.

32. The method of claim 31, further comprising providing a plurality of substrate nanoparticles into said fine filter layer.

33. The method of claim 31, further comprising providing alternating layers of fine filter layers and coarse filter layers.

34. The method of claim 31, further comprising providing a cover layer on said fine filter layer.

35. The method of claim 34, further comprising providing a protective layer on said cover layer.

36. The method of claim 31, further comprising providing a cover layer on said coarse filter layer.

37. The method of claim 36, further comprising providing a hydrophobic layer on said cover layer.

38. The method of claim 37, further comprising providing a protective layer on said hydrophobic layer.

* * * * *